Figure 1:
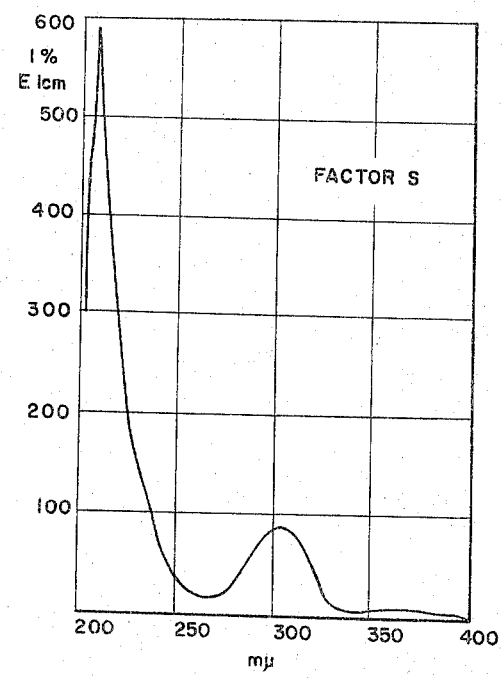

United States Patent Office 3,325,359
Patented June 13, 1967

3,325,359
ANTIBIOTIC FACTOR S AND COMPOSITIONS CONTAINING SAME
Pierre De Somer, Louvain, Hubert Vanderhaeghe, Kessel-Lo, and Paul Van Dijck, Guido Parmentier, and Herman Van de Voorde, Louvain, Belgium, assignors to Recherche et Industrie Therapeutiques, R.I.T., Genval, Belgium, a corporation of Belgium
Filed May 29, 1963, Ser. No. 284,037
Claims priority, application Germany, Apr. 29, 1958, R 23,243
3 Claims. (Cl. 167—65)

This application is a continuation-in-part of our copending application Ser. No. 758,483, filed Sept. 2, 1958 now abandoned.

The invention described herein relates to a novel antibiotic substance hereafter referred to as "factor S," to therapeutic compositions containing this antibiotic product, including therapeutic compositions containing known antibiotics and factor S, and to processes for the preparation of said factor S.

Factor S is obtained from a biosynthetic product known as "antibiotic 899," alternatively known as Staphylomycin (U.S. registered trademark) or virginiamycin. This biosynthetic product may be prepared by cultivating *Streptomyces virginiae*, ATCC 13161, which has been isolated from Belgian soil.

The antibiotic product antibiotic 899 when prepared as herein described is a tan, light brown powder with a slight odor and a bitter taste. It is very soluble in chloroform, soluble in alcohol and acetone, sparingly soluble in water and quite insoluble in petroleum ether and nonpolar aliphatic solvents. The powder displays a pink color when heated in an acidic solution with p-dimethylaminobenzaldehyde. When treated with diazobenzene sulfonic acid in an alkaline solution, antibiotic 899 exhibits a red color reaction. Bromine water gives a precipitate in a hydroalcohol solution of the material.

Antibiotic 899 or Staphylomycin is in fact composed of a number of antibiotic substances in addition to factor S. These substances are active against micrococci and have been named "factor $M_I$" and "factor $M_{II}$." This latter substance, while possessing antibiotic properties is only a minor component of the product.

Antibiotic 899 is shown by chromatographic analysis to contain less than 5% by weight of factor S. We have discovered that combinations of factor S and factor $M_I$ which contain at least 5% and preferably greater than 5%, particularly from 10 to 30%, of factor S, exhibit a synergistic activity wherein the activity of the combination is greater than the sum of the activities of either of the individual components. Thus by isolation of factor S and factor $M_I$, novel synergistic pharmaceutical composition can be prepared by compounding mixtures of factor $M_I$ and factor S wherein the percentage by weight of factor S is at least 5%.

The structure of factor $M_I$ has not been thoroughly elucidated but it appears that if not similar, it is at least closely related to the known antibiotic substance "PA 114A" which is the same as "E 129A" [Todd, Ind. Chim. Bel., 27, p. 1423–7 (1962)]. This relationship is further evidenced by the fact that combinations of factor S and PA 114A or E 129A exhibit similar if not identical synergistic properties as do combinations of factor S and factor $M_I$, even though E 129A, PA 114A and factor $M_I$ are obtained from different organisms. Therefore this invention embraces within its scope those combinations wherein factor S is combined with factor $M_I$, antibiotic E 129A or PA 114A and in which the percentage by weight of factor S is at least 5%. Such combinations are particularly valuable in the treatment of staphylococcal infections, especially those wherein the strain of the pathogenic organism has demonstrated a resistance to classical antibiotic therapy. Typical clinical conditions include osteomyelitis, angina, otitis, pleuritis and general infections wherein pathogenic sensitive microorganisms are involved. The active ingredients are presented in the form of a pharmaceutical composition suitable for administration via any of the usual routes.

The substance factor S demonstrates a melting point of 240–242° C. with sintering at 165–167° C. The melting point is not changed by drying in vacuo at 110° C.; when heated for a few minutes at 170–175° C. (as in an oil bath), a substance is obtained which shows only the 240–242° C. melting point and which demonstrates the same biological activity. Nitrogen content is also unchanged. The physical constants of the unheated product are as follows: $[\alpha]_D^{20} = -28.0°$ (c.=1.0 in ethanol). The ultraviolet spectrum in methanol solution, presented in FIGURE I, demonstrates the following maxima:

$$207\ m\mu,\ E_{1\,cm.}^{1\%} = 590;\ 304\ m\mu,\ E_{1\,cm.}^{1\%} = 86$$

Figure 2:
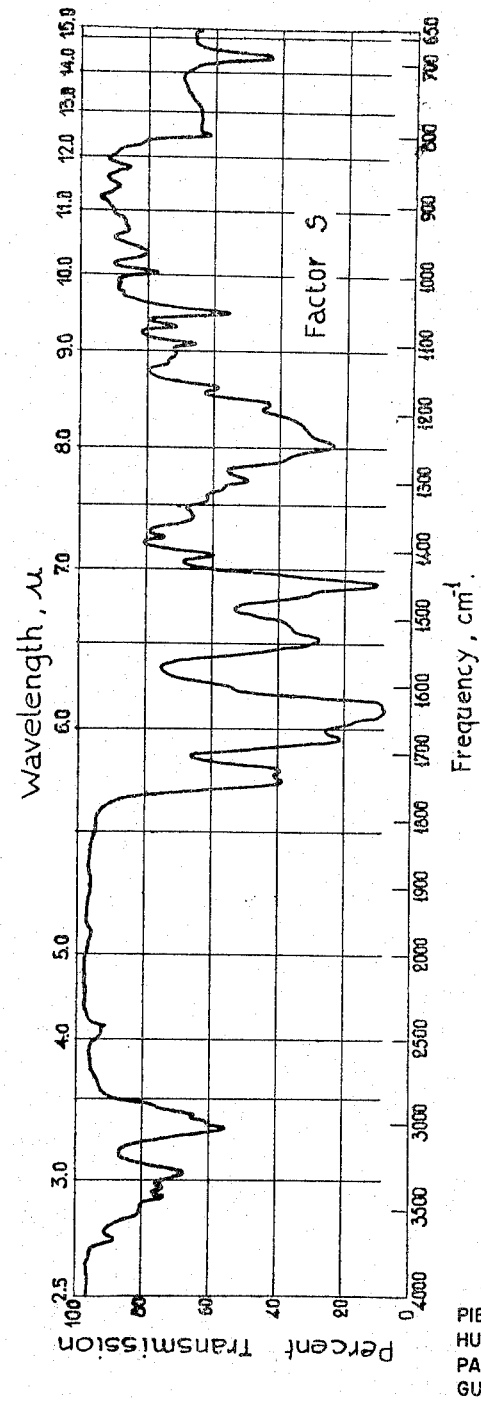

The infrared spectrum as presented in FIGURE 2, exhibits absorption bands at the following frequencies expressed in reciprocal centimeters (thickness: 0.1 mm.; 5% in chloroform):

| Transmission, under 40% | Transmission, from 40 to 60% | Transmission, Over 60% | |
|---|---|---|---|
| 1,742 | 3,023 | 3,680 | 1,115 |
| 1,725 | ¹1,604 | 3,520 | 1,097 |
| 1,667 | ¹1,406 | 3,427 | 1,074 |
| 1,635 | 1,308 | 3,370 | 997 |
| 1,529 | 1,296 | 3,290 | 967 |
| ¹1,504 | 1,186 | 2,416 | 935 |
| 1,448 | 1,162 | 1,381 | 920 |
| ¹1,268 | 1,054 | 1,352 | 874 |
| 1,245 | 690 | 1,325 | 847 |
|  |  | 1,130 | 800 |

¹ Shoulder.

The approximate solubilities of factor S are as follows (in percent): ether 0.1; methanol 0.5; ethanol 1.5; benzene 2.5; acetone and ethyl acetate 3; dioxane 4. The product is insoluble in water and petroleum ether. It is very soluble in chloroform and dimethylformamide. Factor S is a weak acid with a pK'a of 9.0 in ethanol and 7.7 in 1:2 dimethylformamide:water. Molecular weight: 740, 750 by Signer method (chloroform as solvent) and 820, 825 by electrometric titration in absolute methanol.

*Analysis.*—Found: C, 62.75, 62.85; H, 6.68, 6.47; N, 11.49, 11.44; O, 19.38, 1948. Calc. for $C_{43}H_{49}N_7O_{10}$: C. 62.67; H, 5.99; N, 11.90; O, 19.42.

After hydrolysis in 6 N hydrochloric acid at 100° C. for 24 hours, factor S yields a mixture of L-threonine, D-α-amino-N-butyric acid, L-proline, L-phenylglycine, N-methyl-L-phenylalanine, 3-hydroxypicolinic acid, and the ketoamino acid, 4-oxopipecolic acid.

While two of us have postulated a possible structure for factor S [JACS 82, 4414 (1960)], the highly complex nature of the molecule precludes any definite statement as to the certainty of the proposed structure.

Antibiotic 899 from which factor S is obtained is produced by cultivation of the microorganism on the surface of a nutrient medium or preferably by conventional submerged aerobic cultivation. The culture medium should contain an assimilable source of nitrogen, carbohydrates and inorganic salts. Antifoaming agents such as vegetable or mineral oils may be optionally added to reduce excessive foaming.

After sporulation on a classical solid medium, such as potato, the spores of the organism are suspended and inoculated into a classical culture medium, as for example, a composition comprising 25 kg. of powder corn steep, 2 kg. of calcium carbonate, 3 kg. of glucose and 1,000 liters of water. The culture medium is sterilized and the pH adjusted to the range 6.8 to 7.3. Upon developments of the microorganism, the vegetative inoculum is aseptically transferred to a large production tank containing a medium similar to that employed for the inoculum medium.

After a variable incubation period at a temperature from 22 to 28° C., antibiotic activity appears. This antibiotic activity generally reaches a maximum in about 40 hours. The culture broth is filtered and the active product extracted, employing a water immiscible polar solvent such as an ester, ketone, alcohol or halogenated hydrocarbon. Particularly valuable solvents in this respect are methylisobutylketone and amylacetate.

The organic extract is filtered and evaporated under reduced pressure at the temperature equal to or below 50° C. until a concentrated solution is obtained. An excess of an aliphatic hydrocarbon such as hexane is then added to the concentrated solution preferably in quantities from 10 to 12 times the volume of the concentrated solution. The solid which precipitates is collected by filtration or centrifugation and dried. Fatty substances may then be extracted by use of a solvent such as hexane or carbon tetrachloride.

The crude antibiotic 899 thus obtained may be further purified by dissolving the material in a polar water miscible organic solvent such as acetic acid at, at least, a concentration of 80% in water and precipitating the purified product by addition of an excess of water. After filtration, the precipitate is dissolved in a solvent such as chloroform or methylene chloride and purified over an absorbent such as activated clay or magnesium silicate. The purified product may be recovered from the chloroform solution by the addition of an excess of an aliphatic hydrocarbon such as hexane.

This purified sample of antibiotic 899 may be separated into its individual components by use of chromatographic techniques; e.g., development on a silica gel column and elution with a halogenated organic solvent to which may be added a nonpolar organic solvent, factor S being the first substance eluted. By increasing the polarity of the solvents, as for example, by adding acetone, the remaining fractions comprising factor $M_I$ and $M_{II}$ are obtained. These two components may themselves be separated by the addition of petroleum ether which causes precipitation of factor $M_I$. In addition to the silica gel other chromatographic means such as bentonite, calcium silicate and magnesium silicate may be employed.

The following examples will serve to further typify the nature of the present invention but are not to be construed as limiting the scope thereof.

*Example 1*

This example describes a process for extracting and purifying crude antibiotic 899.

Ten thousand liters of filtered broth, having an antibiotic activity equivalent to 108 mcg./ml. of the standard product, are extracted with a countercurrent apparatus by means of 1,700 l. of methylisobutylketone. The extracts are then filtered and concentrated under reduced pressure at 50° C. to a volume of 40 l. The antibiotic product is precipitated from this concentrated solution by adding 480 l. of hexane. After filtrating and drying, 1145 g. of a brown powder are obtained having an activity equivalent to 83% of the activity of the standard product. This material is suspended in 14 l. of carbon tetrachloride and refiltered. The filtration cake is dissolved in 23 l. of aqueous 80% acetic acid. After filtering this solution, 450 l. of water are added to the solution with continuous stirring in order to precipitate the antibiotic substance. The mother liquor, which still contains an appreciable amount of antibiotic product, may be separated from the precipitate by filtration to recover additional material. After drying, the product weighs 412 g. with an antibiotic activity equal to 88% of the activity of a standard.

The product is dissolved in 4 l. of chloroform, and 85 g. of magnesium silicate are added to the solution which is then vigorously stirred. The magnesium silicate is discarded after filtration. The antiobiotic product is precipitated by adding 80 l. of hexane to the filtrate, and collected by filtration. The product thus obtained weighs 336 g. after drying with an antibiotic activity equivalent to 97% of a standard.

The mother liquor obtained is extracted by means of 10 l. of chloroform. The chloroformic solution is separated from the aqueous layer, filtered and concentrated under reduced pressure at a temperature of 50° C. until a volume of 3 l. is obtained. Twenty-five grams of magnesium silicate are introduced and after vigorous mixing followed by removal of the magnesium silicate by filtration, the product is precipitated by the addition of 40 l. of hexane. In this way, 365 g. of the product are obtained having an antibiotic activity equivalent to 91.4% of the standard.

The final yield of purified antibiotic product is thus 60% of the activity present in the filtered broth.

*Example 2*

This example describes a process for the extraction and purification of antibiotic 899 in the insoluble fraction of the culture whole broth.

A culture whole broth containing an antibiotic activity corresponding to 127 mcg./ml. before filtration, and corresponding to 114 mcg./ml. after filtration (by comparison with a standard), may be considered as possessing in its insoluble part an activity which is equivalent to 13 mcg. of the standard product per ml. of culture whole broth.

The cake, obtained after filtrating 10,000 l. of the above mentioned culture whole broth, is mixed with 500 l. of hexane. After separation of the hexane, the antibiotic substance is extracted with 500 l. of methylisobutylketone. The ketonic solution is concentrated to a volume of 12 l. and the antibiotic product is precipitated by addition of 140 l. of hexane.

After filtrating and drying the precipitate, 255 g. of brown powder are obtained, the antibiotic activity of which is equivalent to 62% of the standard product.

The product thus obtained is then treated as described in Example 1. The weight of the final product is 7.6 g. and its antibiotic activity is equivalent to 91% of the standard, the final yield in purified substance is thus 53% of the activity present in the insoluble part of the culture whole broth.

*Example 3*

A solution of 21.5 g. of antibiotic 899 in 250 ml. of chloroform and 250 ml. of benzene is introduced on a column (diameter 3.5 cm.) containing 150 g. of silica gel. The column is developed with chloroform, the following zones being observed:

1. A narrow brown band
2. A broad yellow band
3. A narrow brown band
4. A broad tan band
5. A dark brown band Zones 1, 2 and 3 are eluted with chloroform and the eluate evaporated. The residue is dissolved in hot methanol, cooled until crystallization occurs, and filtered. The white crystals so collected correspond to factor S, M.P. 240–242° C. with sintering at 165–167° C., other physical constants as hereinbefore presented.

Zone 4 is eluted by means of a mixture of chloroform and acetone (5 to 10%). The eluate is evaporated and the residue dissolved in 300 ml. of hot acetone. Addition of 300 ml. of petroleum ether causes a precipitate to form which upon drying and recrystallization from acetone demonstrates a melting point of 165–167° C. (dec).

This substance, factor $M_I$, is a neutral tan powder, $[\alpha]_D^{20} = -190 \pm 2$ (c.=0.5 in ethanol); $-174 \pm 2$ (c.=0.5 in methanol). Its ultraviolet spectrum presents an absorption maximum at 216 mμ, $$E\,_{1\,cm.}^{1\%} = 582$$

with an inflection at 270 mμ, $$E\,_{1\,cm.}^{1\%} = 200$$

Approximate solubilities are as follows (percent): ether 0.1; benzene 0.3; ethyl acetate 0.5; acetone 2; methanol and ethanol 4; dioxane and tetrahydrofuran 5. The product is practically insoluble in water and petroleum ether and very soluble in chloroform and dimethylformamide.

*Analysis.*—Found: C, 61.85, 61.12; H, 6.79, 6.72; N, 7.56, 7.61; O, 23.50, 23.55. Calc. for $C_{28}H_{36}N_3O_8$: C, 61.99; H, 6.69; N, 7.74; O, 23.61.

Hydrolysis in 6 N hydrochloric acid at 100° C. for 24 hours produces proline and glycine. When hydrogenated and then hydrolysed as above, factor $M_I$ gives D-proline, L-alanine and traces of glycine.

When the chromatographic column is eluted with chloroform and acetone (15 to 50%) the remaining material comprises a mixture of factor $M_I$ and factor $M_{II}$, the latter substance being present only in small quantities.

*Example 4*

Having isolated and purified the major components of antibiotic 899, it is possible to recombine factor S and factor $M_I$ in properties wherein factor S is present at least in an amount of 5%. This recombined mixture may then be employed in the preparation of pharmaceutical compositions of which the following while not restrictive are typical.

EYE WASH

A. *Powder vial*

|  | Mg. |
|---|---|
| 5% factor S } | 5 |
| 95% factor $M_I$ } |  |
| Sodium borate | 5.73 |
| Boric acid | 120.27 |
| Sodium chloride | 3 |
| Polysorbate 80 | 1 |

B. *Diluent vial*

| | |
|---|---|
| Benzalkonium chloride | 0.15 |
| Distilled water q.s.ad. 5 ml. | |

TABLETS

|  | Mg. |
|---|---|
| 10% factor S } | 1 |
| 90% factor $M_I$ } |  |
| Gum arabic | 30 |
| Talc | 20 |
| Magnesium stearate | 10 |
| Menthol | 1.2 |
| Saccharin sodium | 2 |
| Vanillin | 2 |
| Ethyl aminobenzoate | 1 |
| D and C yellow No. 10 | 0.53 |
| Sucrose | 932.27 |

CAPSULES

|  | Mg. |
|---|---|
| 15% factor S } | 150 |
| 85% factor $M_I$ } |  |
| Liquid paraffin | 7.5 |
| Magnesium stearate | 6 |
| Anhydrous dibasic calcium phosphate q.s.ad. | 300 |

OINTMENT

|  | Mg. |
|---|---|
| 10% factor S } | 1 |
| 90% factor $M_I$ } |  |
| Polyethylene glycol 4,000 | 300 |
| Polyethylene glycol 400 q.s.ad. 1 g. |  |

PARENTERAL SUSPENSION

|  | Mg. |
|---|---|
| 5% factor S } | 50 |
| 95% factor $M_I$ } |  |
| Sodium chloride | 90 |
| Sodium carboxymethylcellulose | 30 |
| Lecithin | 1 |
| Polysorbate 80 | 0.75 |
| Water for injection, 10 ml. |  |

What is claimed is:

1. The antibiotic factor S, said factor S being a crystalline weak acid characterized by the following properties: molecular formula, $C_{43}H_{49}N_7O_{10}$; melting point, 240–242° C. with sintering at 165 to 167° C.; pK'a, 9.0 in ethanol and of 7.7 in 1:2 dimethylformamide: water; specific rotation $[\alpha]_D^{20} = -28.0$ (c.=1.0 in ethanol); giving after hydrolysis in 6 N hydrochloric acid (24 hours at 100° C.) a mixture of L-threonine, D-α(-amino-n-butyric acid, L-proline, L-phenylglycine, N-methyl-L-phenylalanine, an amino acid giving a yellow color with ninhydrin and 3-hydroxypicolinic acid; the ultraviolet spectrum of a methanol solution of this antibiotic showing the following maxima:

$$207\ m\mu,\ E\,_{1\,cm.}^{1\%} = 590\ \text{and}\ 304\ m\mu,\ E\,_{1\,cm.}^{1\%} = 86$$

the absorption bands in the infrared region of the spectrum of a 5% solution (in chloroform) at the following frequencies expressed in reciprocal centimeters (thickness: 0.1 mm.) being as follows:

| Transmission, under 40% | Transmission, from 40 to 60% | Transmission, Above 60% | |
|---|---|---|---|
| 1,742 | 3,023 | 3,680 | 1,115 |
| 1,725 | ¹ 1,604 | 3,520 | 1,097 |
| 1,677 | 1,406 | 3,427 | 1,074 |
| 1,635 | ¹ 1,308 | 3,370 | 997 |
| 1,529 | 1,296 | 3,290 | 967 |
| ¹ 1,504 | 1,186 | 2,416 | 935 |
| 1,448 | 1,162 | 1,381 | 920 |
| ¹ 1,268 | 1,054 | 1,352 | 874 |
| 1,245 | 690 | 1,325 | 847 |
|  |  | 1,130 | 800 |

¹ Shoulder.

2. A pharmaceutical composition having antibiotic activity comprising a mixture of staphylomycin factor $M_I$, and a synergistic antibiotic substance as defined in claim 1, said synergistic substance comprising at least 5% by weight of the mixture.

3. A pharmaceutical composition having antibiotic activity comprising a mixture of Staphylomycin factor $M_I$, and a synergistic antibiotic substance as defined in claim 1, said synergistic substance comprising 10 to 30% by weight of the mixture.

References Cited

Antibiotics and Chemotherapy, 7 606–614 (1957); 7 625–629 (1957); 5 632–639 (1955).
J. Am. Chem. Soc., 82 4414–442 (1960).
Nature, 194, 183 (1962).

ALBERT T. MEYERS, *Primary Examiner.*

JULIAN S. LEVITT, *Examiner.*

S. ROSEN, *Assistant Examiner.*